United States Patent Office 3,708,461
Patented Jan. 2, 1973

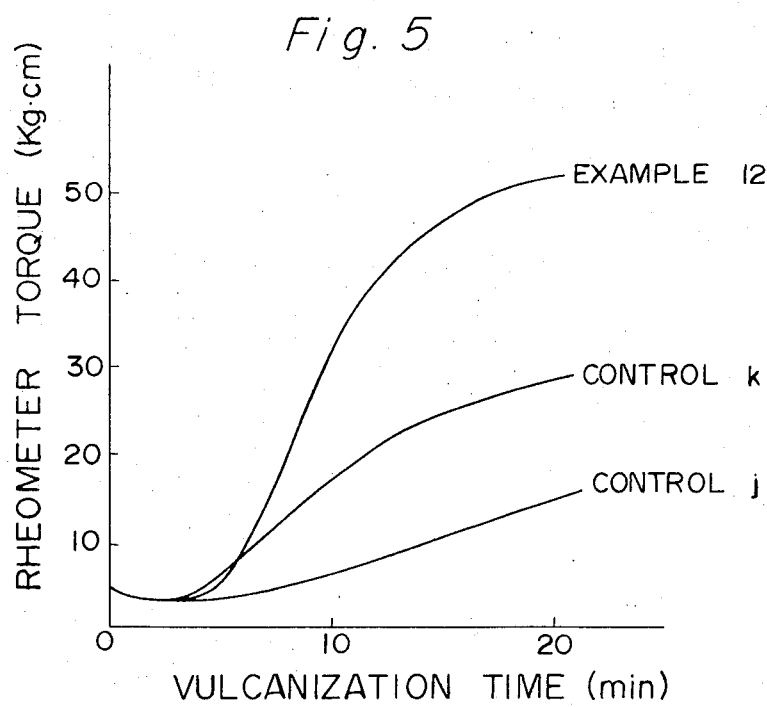

3,708,461
PROCESS FOR THE VULCANIZATION OF
EPIHALOHYDRIN POLYMERS
Tetsuo Karastu, Yokohama, Hiroshi Sasaki, Kawasaki, and Hideo Fukuda, Yokohama, Japan, assignors to The Japanese Geon Company Ltd., Tokyo, Japan
Filed Dec. 14, 1970, Ser. No. 97,855
Claims priority, application Japan, Dec. 15, 1969, 44/100,105
Int. Cl. C08g 23/00
U.S. Cl. 260—79      11 Claims

ABSTRACT OF THE DISCLOSURE

A process for the vulcanization of epihalohydrin polymers, which comprises heating an epihalohydrin homopolymer or a copolymer of an epihalohydrin with at least one other epoxide, in the presence of, per 100 parts by weight of the polymer, 0.2–10.0 parts by weight of at least one compound selected from the group consisting of 2-mercaptoimidazolines and thioureas which are optionally substituted with alkyl radicals of 1–4 carbon atoms leaving at least one hydrogen atom unsubstituted, and 0.2–10.0 parts by weight of at least one organic polysulfide.

---

Figure 1:
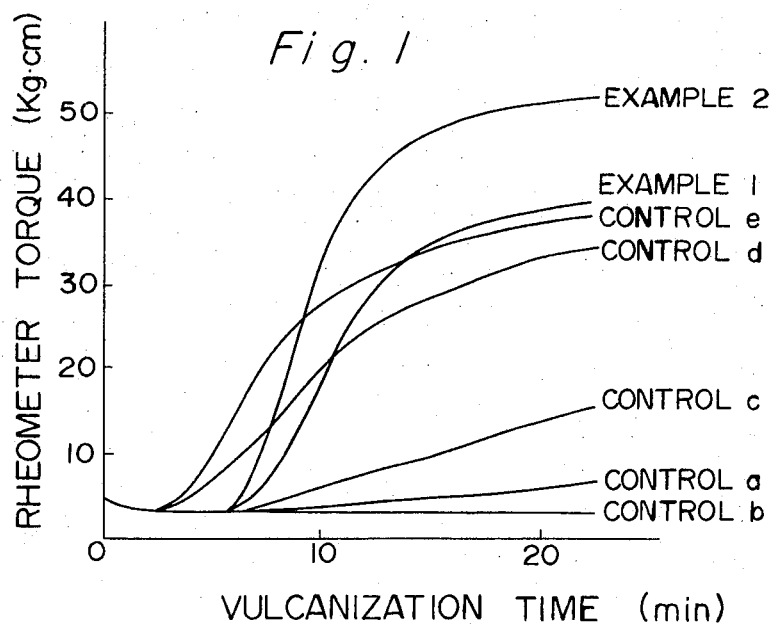
Figure 2:
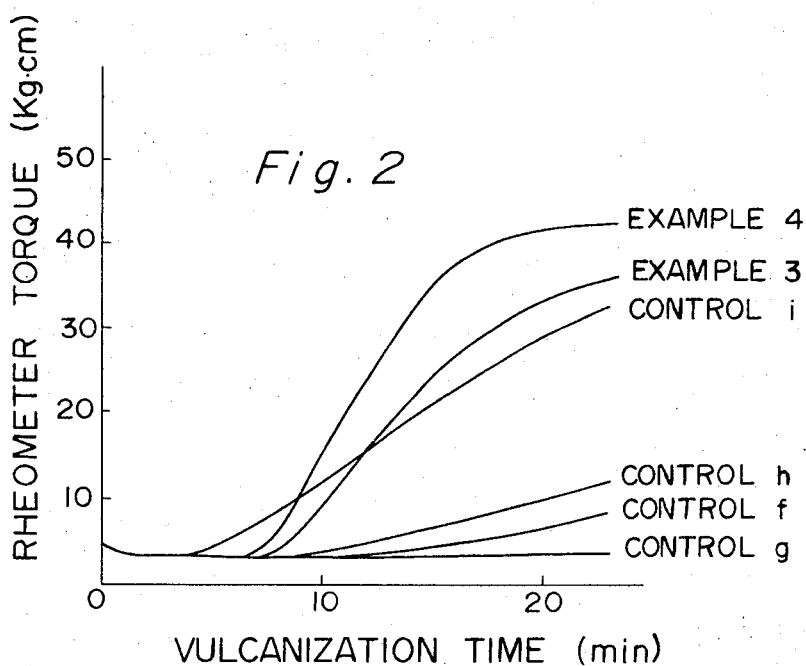
Figure 3:
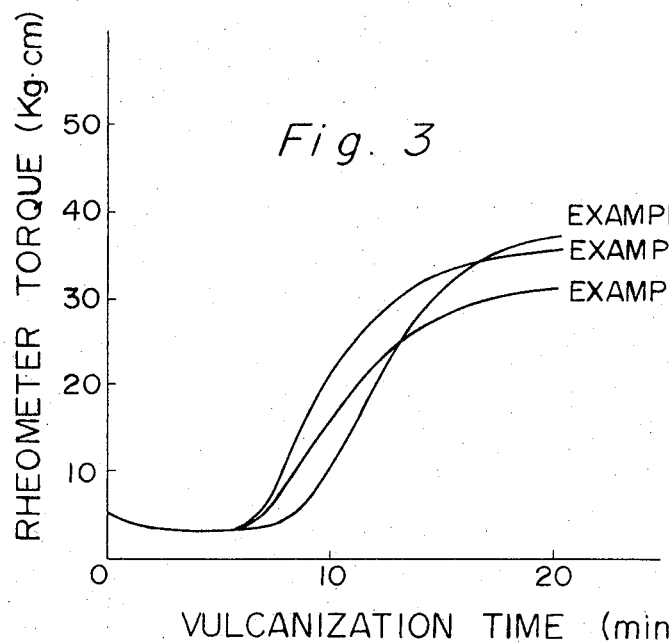
Figure 4:
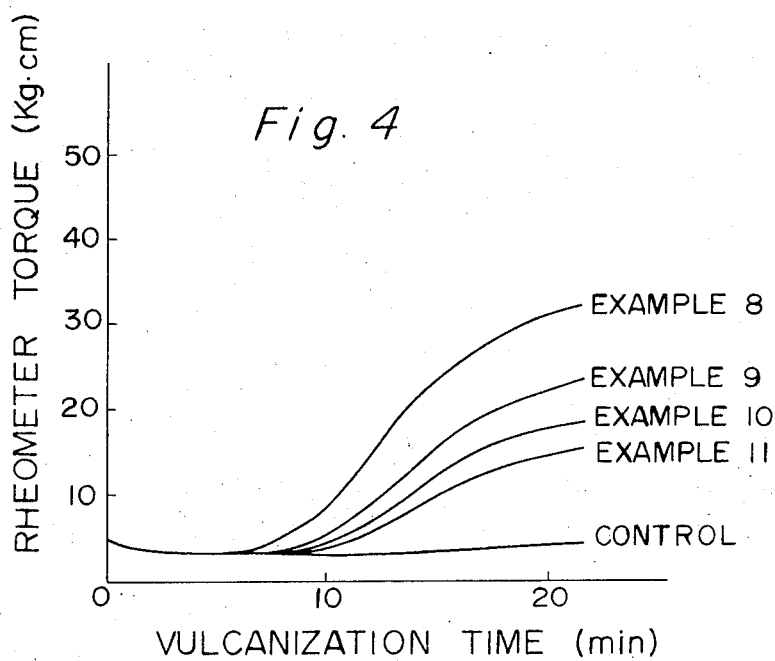

This invention relates to a process for the vulcanization of epihalohydrin homopolymers or copolymers with a novel system of vulcanizing agents.

As the vulcanizing agents for epihalohydrin polymers, those which comprise 2-mercaptoimidazolines and compounds of a metal of Group II–A, II–B or IV–B of the Periodic Table and those which comprise amines and sulfur, dithiocarbamate, thiuramsulfide or thiazole are well known. When epihalohydrin polymers are vulcanized with those known systems, vulcanized rubber of a considerably high degree of vulncanization can be obtained. However, the induction period of such vulcanization is extremely short. For this reason the rubber compositions blended with those known vulcanizing agents are apt to cause scorching, during their milling or storage.

Accordingly, the object of the present invention is to provide a process for the vulcanization of epihalohydrin polymers with the vulcanizing system showing a suitably long induction period of vulcanization.

The term "a suitably long induction period" used herein means that when a vulcanizing agent of the present invention and a conventional vulcanizing agent are respectively used in an amount such that after a certain period of time a degree of vulcanization of an identical extent is obtained, the former case has a longer induction period of vulcanization. Or, when the novel vulcanizing system of the invention is employed in such a quantity as will give the equivalent length of induction period with that of the conventional systems, the former achieves the intended vulcanization within the shorter vulcanization time.

The above object of the invention is accomplished by the process which comprises heating an epihalohydrin homopolymer or copolymer of epihalohydrin with at least one other epoxide, in the presence of (I) at least one compound selected from the group consisting of 2-mercaptoimidazolines and thioureas which are optionally substituted with alkyl radicals of 1–4 carbons leaving at least one unsubstituted hydrogen atom, and (II) at least one organic polysulfide.

The vulcanizing system of the present invention consisting of the above compounds (I) and (II) shows the favorable vulcanizing characteristics as above-described, and further brings about the following advantageous aspects to the subject process.

(1) The vulcanizing system is non-contaminating, and is well-suited to light color blending. Consequently, the system has broader utilities compared with the conventional systems employing the most typical of the known vulcanizing agents, i.e., lead compounds or amines, as one of the components, which invariably give black or brown vulcanization products.

(2) Because the vulcanizing system of the invention contains no metal oxide, it can form a homogeneously miscible vulcanizing agent-blended rubber solution in a suitably selected solvent. Therefore, the system is valuable when rubber is used in the form of a solution such as in adhesives and coating agents. In view of the fact, as occasionally experienced, that it is extremely difficult to uniformly disperse inorganic matter such as metal oxides in such solutions, the vulcanizing system of the invention has opened a very valuable utility for rubber.

The epihalohydrin polymers vulcanizable in accordance with the invention comprises homopolymers of epichlorohydrin or epibromohydrin, copolymers of two different epihalohydrins, and copolymers of one epihalohydrin with at least one other epoxide. Examples of useful epoxides include ethylene oxide, propylene oxide, butylene oxide, butadiene monoxide, cyclohexene oxide, ethyl glycidyl ether, 2-chloroethyl glycidyl ether, hexyl glycidyl ether, allyl glycidyl ether, etc.

2-mercaptoimidazolines are the compounds represented by the general formula below:

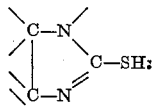

While any compound within the scope of above formula is usable, the most typically used are 2-mercaptoimidazoline, 4-methyl-2-mercaptoimidazoline, and 5-ethyl-4-butyl-2-mercaptoimidazoline.

The thioureas are those represented by the general formula,

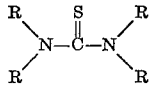

in which at least one of the R's is hydrogen, and the rest are alkyl radicals of 1 to 4 carbon atoms, specific examples including thiourea, ethyl thiourea, butyl thiourea, diethyl thiourea, dibutyl thiourea, triethyl thiourea, and tributyl thiourea.

Also as the organic polysulfide, morpholine polysulfide, thiouram polysulfide, etc. are effective. Specific examples include morpholine disulfide, tetramethylthiuram disulfide, dipentamethylenethiuram disulfide, dipentamethylenethiuram tetrasulfide, etc.

The 2-mercaptoimidazolines or thioureas, and organic polysulfides, are each used in the quantities of 0.2–10.0 parts by weight, preferably 0.5–5.0 parts by weight, per 100 parts by weight of the epihalohydrin polymer or copolymer of epihalohydrin with other epoxide or epoxides. The specific quantities are determined for individual cases, in accordance with the required degree of vulcanization of the vulcanized rubber product.

The vulcanizing agents can be compounded or mixed with the polymer in conventional manner. For example, ordinary roll mixing, Banbury's mixing, or solution mixing may be applied. The intended vulcanization is achieved by heating the resulting mixture. The vulcanizing conditions are variable over a wide range. The vulcanization is complete in the order of minutes at a temperature of about 150° C., and in the order of days at room temperature. Normally the vulcanization temperature ranges approximately from 120–180° C., preferably approximately 140–170° C. The vulcanization time varies in reverse manner to the temperature, which may range approximately from 10-120 minutes, preferably approximately from 15 to 60 minutes. In certain cases, the vulcanization at approximately 100-150° C. may be continued for an hour to three days, to decrease the compression set of the product under high temperatures.

The vulcanizing system of the invention may contain other components besides the named vulcanizing agents, such as the additives normally used with vulcanized rubber products, e.g., metal oxide, reinforcing agent, filler, pigment, plasticizing agent, softening agent, antioxidant, etc. Particularly the concurrent use of oxides of Group II metals of the Periodic Table shows the tendency of increasing the degree of vulcanization while retaining the light color of products, and therefore is valuable for certain utilities.

Hereinafter the invention will be more concretely explained with reference to the working examples, in which all parts given in relation to the vulcanizing characteristics of epihalohydrin polymer compositions in accordance with the invention and physical properties of the vulcanized products are by weight.

The mixing was effected in all runs with a 6-inch long roll which was continually cooled with running city water. The roll temperature was approximately 20-30° C. at the start, and at the end approximately 40-60° C. due to the exothermic phenomenon with rubber. The mixing time was approximately 20-30 minutes, and the vulcanizing agents were added within the last 10 minutes.

The vulcanizing characteristcs were determined at 155° C., with an oscillating disk rheometer (manufactured by Toyo Seiki Ltd.). The rheometer recorded the torque exerted on the doubly conical rotor which was rotated 3 times per minute and oscillated with an angle of 3°, over a predetermined duration of time.

Referring to the drawings, FIGS. 1 through 5 are the graphs showing the vulcanizing characteristics of epihalohydrin polymers employed in the later given examples.

In FIGS. 1-5, the longer the time passed before the rise in the curve drawn by the rheometer, the longer the induction period. Also the greater the angle of rise, the greater the rate of vulcanization, and the greater the torque, the higher the degree of vulcanization.

Examples 1-2

The vulcanizing characteristics measured with the oscillating disk rheometer as to the carbon black blends comprising polyepichlorohydrin ("Hydrin 100" produced by Goodrich Chemicals, Co.), 2-mercaptoimidazoline, tetramethylthiuram disulfide, and optionally magnesia, were compared with those of the control samples (the same polyepichlorohydrin blended with: 2-mercaptoimidazoline alone; tetramethylthiuram disulfide alone; 2-mercaptoimidazoline and magnesia or red lead; and tetramethylthiuram disulfide and hexamethylenediamine carbamate). The blended components with their respective quantities are given in Table 1, and the vulcanizing characteristics, in FIG. 1. FIG 1 clearly demonstrates that with a single vulcanizing agent such as 2-mercaptoimidazoline or tetramethylthiuram disulfide, substantially no appreciable degree of vulcanization was achived, but the concurrent use of the two achieved rapid vulcanization with sufficiently long induction period (approximately 6 minutes). Also in comparison with the vulcanizing system composed of 2-mercaptoimidazoline and red lead or magnesia, the subject system exhibited the more desirable vulcanizing characteristics. Both systems composed of 2-mercaptoimidazoline and red lead, and of hexamethylenediamine carbamate and tetramethylthiuram disulfide achieved considerably high degrees of vulcanization, but the induction period was short (approximately 3 minutes) and therefore the operation was unstable. Furthermore because the rising gradients of vulcanization curves were gentle, longer periods were required before the completion of vulcanization.

TABLE 1

| Blended component | Example 1 | Example 2 | Control a | Control b | Control c | Control d | Control e |
|---|---|---|---|---|---|---|---|
| Polyepichlorohydrin | 100 | 100 | 100 | 100 | 100 | 100 | 100 |
| Tin stearate | 2 | 2 | 2 | 2 | 2 | 2 | 2 |
| FEF carbon black | 40 | 40 | 40 | 40 | 40 | 40 | 40 |
| 2-mercaptoimidazoline | 3 | 3 | 3 | | | 3 | 3 |
| Tetramethylthiuram disulfide | 1 | 1 | | 1 | | | 1 |
| Magnesia | | 5 | | | 5 | | |
| Red lead | | | | | | 5 | |
| Hexamethylenediamine carbamate | | | | | | | 1 |

Examples 3-4

The vulcanizing characteristics measured with oscillating disk rheometer as to the carbon black blends comprising epichlorohydrin-ethylene oxide copolymer ("Hydrin 200", produced by Goodrich Chemicals, Co.), dibutyl thiourea, tetramethylthiuram disulfide, and optionally magnesia, were compared with those of the control samples (the same epichlorohydrin-ethylene oxide copolymer blended with: dibutyl thiourea alone; tetramethylthiuram disulfide alone; or dibutylthiourea and a metal oxide). The blended components and their respective quantities are shown in Table 2, and the vulcanizing characteristics, in FIG. 2. From the FIG. 2, it is clear that the vulcanizing systems within the scope of this invention exhibit sufficiently long induction periods and achieve high degrees of vulcanization.

TABLE 2

| Blended component | Example 3 | Example 4 | Control f | Control g | Control h | Control i |
|---|---|---|---|---|---|---|
| Epichlorohydrinethylene oxide copolymer | 100 | 100 | 100 | 100 | 100 | 100 |
| Tin stearate | 2 | 2 | 2 | 2 | 2 | 2 |
| FEF carbon black | 40 | 40 | 40 | 40 | 40 | 40 |
| Dibutyl thiourea | 5 | 5 | 5 | | 5 | 5 |
| Tetramethylthiuram disulfide | 1 | 1 | | 1 | | |
| Magnesia | | 5 | | | 5 | |
| Red lead | | | | | | 5 |

Examples 5-7

The significance of various organic polysulfides to the vulcanizing characteristics of the system comprising 2-mercaptoimidazoline was examined as to vulcanization of epichlorohydrin-ethylene oxide copolymer (the same "Hydrin 200" as employed in Examples 3-4), using the oscillating disk rheometer similarly to Examples 1-4. The blended components in each of the examples with their quantities are given in Table 3, and the vulcanizing characteristics, in FIG. 3. In all of the examples favorable characteristics were obtained.

TABLE 3

| Blended component | Example 5 | Example 6 | Example 7 |
|---|---|---|---|
| Epichlorohydrin-ethylene oxide copolymer | 100 | 100 | 100 |
| Tin stearate | 2 | 2 | 2 |
| FEF carbon black | 40 | 40 | 40 |
| 2-mercaptoimidazoline | 3 | 3 | 3 |
| Tetramethylthiuram disulfide | 1 | | |
| Morpholine disulfide | | 1 | |
| Dipentamethylenethiuram disulfide | | | 1 |

Examples 8-11

The effect of thioureas as used concurrently with tetramethylthiuram disulfide on the vulcanizing characteristics of polyepichlorohydrin (the same "Hydrin 100" as employed in Examples 1-2) was examined, using the oscillating disk rheometer similarly to the other examples. The blended components and their quantities are given in Table 4, and the resulting vulcanizing characteristics, in FIG. 4. From FIG. 4, it can be understood that regardless of the specific type of thiourea, stable rubber compositions are obtained with approximately 6–9 minutes of induction period. Furthermore, the number of carbon atoms of the substituent alkyl radicals of thioureas are within the range of 1 to 4, as already specified. As is clear from FIG. 4, the concurrent use of for example, tetramethylthiuram disulfide and diphenyl thiourea as in the control is ineffective.

TABLE 4

| Blended component | Example | | | | Control |
|---|---|---|---|---|---|
|  | 8 | 9 | 10 | 11 |  |
| Polyepichlohydrin | 100 | 100 | 100 | 1000 | 100 |
| Tin stearate | 2 | 2 | 2 | 2 | 2 |
| FEF carbon black | 40 | 40 | 40 | 40 | 40 |
| Tetramethylthiuram disulfide | 1 | 1 | 1 | 1 | 1 |
| Thiourea | 3 |  |  |  |  |
| Diethyl thiourea |  | 3 |  |  |  |
| Dibutyl thiourea |  |  | 3 |  |  |
| Triethyl thiourea |  |  |  | 3 |  |
| Diphenyl thiourea |  |  |  |  | 3 |

Example 12

As to a white blend of epichlorohydrin-ethylene oxide copolymer ("Hydrin 200"), the effect of known vulcanizing systems (magnesia and 2-mercaptoimidazoline, or magnesia and hexamethylenediamine carbamate) was compared with that of the vulcanizing system in accordance with the present invention. That is, the vulcanizing characteristics were compared, using the same oscillating disk rheometer similarly to other examples. The blended components and their quantities are given in Table 5, and the measured vulcanizing characteristics, in FIG. 5, tobether with the similar data of the control runs. From FIG. 5, it can be understood that, when the induction period is made approximately the same in the examples and control runs, the rate of cure is far greater with the vulcanizing system of the invention.

TABLE 5

| Blended component | Example 12 | Control | |
|---|---|---|---|
|  |  | j | k |
| Epichlorohydrin-ethylene oxide copolymer | 100 | 100 | 100 |
| Tin stearate | 2 | 2 | 2 |
| Nipsil VN3 (silicic acid, 86-87%) (products of Nippon Silica Kogyo K.K., Japan) | 30 | 30 | 30 |
| 2-mercaptoimidazoline | 3 | 3 |  |
| Tetramethylthiuram disulfide | 2 |  |  |
| Hexamethylenediamine carbamate |  |  | 2 |
| Magnesia |  | 5 | 5 |

Examples 13–14

The carbon black blends of polyepichlorohydrin ("Hydrin 100") and that of epichlorohydrin-ethylene oxide copolymer ("Hydrin 200") were each vulcanized for 30 minutes at 155° C. with the vulcanizing system of the subject invention composed of 2-mercaptoimidazoline and tetramethylthiuram disulfide, or a conventional vulcanizing system composed of 2-mercaptoimidazoline and magnesia. The vulcanized products were punched into the form of JIS No. 3 dumbbell, and their physical properties were measured. The blended components, their quantities, and the physical properties of the vulcanized product, of each run are shown in Table 6. The higher tensile strength, and 300% modulus exhibited by the products vulcanized with the subject system indicate that the products had higher degree of vulcanization compared with that of the conventional vulcanization products.

TABLE 6

| Blended component | Example | | Control | |
|---|---|---|---|---|
|  | 13 | 14 | l | m |
| Polyepichlorohydrin | 100 |  | 100 |  |
| Epichlorohydrin-ethylene oxide copolymer |  | 100 |  | 100 |
| Tin stearate | 2 | 2 | 2 | 2 |
| FEF carbon black | 40 | 40 | 40 | 40 |
| Phenyl β-naphthylamine | 1.5 | 1.5 | 1.5 | 1.5 |
| Nickel dibutyldithiocarbamate | 0.5 | 0.5 | 0.5 | 0.5 |
| 2-mercaptoimidazoline | 1.5 | 1.5 | 1.5 | 1.5 |
| Tetramethylthiuram disulfide | 2.0 | 2.0 |  |  |
| Magnesia |  |  | 5 | 5 |
| Physical properties of vulcanization product: |  |  |  |  |
| Tensile strength (kg./cm.²) | 135 | 120 | 112 | 106 |
| 300% modulus (kg./cm.²) | 101 | 91 | 79 | 62 |
| Elongation (percent) | 520 | 560 | 570 | 580 |
| Hardness (JIS process) | 68 | 65 | 73 | 68 |

We claim:
1. A process for the vulcanization of an epihalohydrin polymer, which comprises heating at 120 to 180° C. an epihalohydrin homopolymer or a copolymer of an epihalohydrin with at least one other epoxide in the presence of, per 100 parts by weight of the polymer, (a) 0.2 to 10.0 parts by weight of an organic polysulfide selected from group consisting of a 2-mercaptoimidazoline and a thiourea represented by the formula

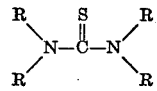

in which at least one R is hydrogen and the remainder are alkyl radicals of 1 to 4 carbon atoms, and (b) 0.2 to 10.0 parts by weight of an organic polysulfide selected from the groups consisting of a morpholine polysulfide and a thiuram polysulfide.

2. A process for the vulcanization of an epihalohydrin polymer, which comprises heating at 120 to 180° C. an epihalohydrin homopolymer or a copolymer of an epihalohydrin with at least one other epoxide in the presence of, per 100 parts by weight of the polymer, (a) 0.2 to 10.0 parts by weight of a compound selected from the group consisting of a 2-mercaptoimidazoline and a thiourea represented by the formula

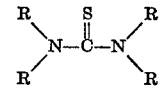

in which at least one R is hydrogen and the remainder are alkyl radicals of 1 to 4 carbon atoms, (b) 0.2 to 10.0 parts by weight of an organic polysulfide selected from the group consisting of a morpholine polysulfide and a thiuram polysulfide and (c) 1 to 10 parts by weight of an oxide of a metal of Group II of the Periodic Table.

3. The process of claim 1 wherein (a) is 2-mercaptoimidazoline.

4. The process of claim 1 wherein said organic polysulfide is tetramethylthiuram disulfide.

5. The process of claim 1 wherein the epihalohydrin polymer is an epichlorohydrin polymer.

6. The process of claim 1 wherein the epihalohydrin polymer is a copolymer of epichlorohydrin and ethylene oxide.

7. The process of claim 2 wherein (a) is 2-mercaptoimidazoline.

8. The process of claim 2 wherein said organic polysulfide is tetramethylthiuram disulfide.

9. The process of claim 2 wherein the epihalohydrin polymer is an epichlorohydrin polymer.

10. The process of claim 2 wherein the epihalohydrin polymer is a copolymer of epichlorohydrin and ethylene oxide.

11. The process of claim 2 wherein said oxide of a metal of Group II is magnesia.

References Cited

UNITED STATES PATENTS

| 3,275,573 | 9/1966 | Vandenberg | 260—2 |
| 3,503,910 | 3/1970 | Amberg et al. | 260—18 |

DONALD E. CZAJA, Primary Examiner

M. I. MARQUIS, Assistant Examiner

U.S. Cl. X.R.

260—2 A, 37 EP, 88.3 A

UNITED STATES PATENT OFFICE
CERTIFICATE OF CORRECTION

Patent No. 3,708,461            Dated January 2, 1973

Inventor(s) TETSUO KARATSU ET AL

It is certified that error appears in the above-identified patent and that said Letters Patent are hereby corrected as shown below:

Claim 1, line 6 delete
"an organic polysulfide selected from"

and insert

--a compound selected from the--

Change the inventor's name from TETSUO KARASTU to TETSUO KARATSU throughout.

Signed and sealed this 17th day of April 1973.

(SEAL)
Attest:

EDWARD M. FLETCHER, JR.
Attesting Officer

ROBERT GOTTSCHALK
Commissioner of Patents